United States Patent
Romrell et al.

(10) Patent No.: US 9,648,359 B2
(45) Date of Patent: May 9, 2017

(54) METHOD AND SYSTEM FOR ADVERTISEMENT MULTICAST PRE-DELIVERY CACHING

(71) Applicant: ARRIS Enterprises, Inc., Suwanee, GA (US)

(72) Inventors: David A. Romrell, Hillsboro, OR (US); Gordon B. Beacham, Encinitas, CA (US); Thomas L. DuBreuil, Ivyland, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 50 days.

(21) Appl. No.: 14/557,811

(22) Filed: Dec. 2, 2014

(65) Prior Publication Data

US 2016/0156945 A1    Jun. 2, 2016

(51) Int. Cl.
| | |
|---|---|
| *H04N 7/10* | (2006.01) |
| *H04N 21/234* | (2011.01) |
| *H04N 21/81* | (2011.01) |
| *G06Q 30/02* | (2012.01) |
| *H04N 21/236* | (2011.01) |
| *H04N 21/61* | (2011.01) |
| *H04N 21/858* | (2011.01) |

(52) U.S. Cl.
CPC ....... *H04N 21/23424* (2013.01); *G06Q 30/02* (2013.01); *H04N 21/23418* (2013.01); *H04N 21/23608* (2013.01); *H04N 21/6125* (2013.01); *H04N 21/812* (2013.01); *H04N 21/8586* (2013.01)

(58) Field of Classification Search
CPC ............................................... H04N 21/23424
USPC ....................................................... 725/32, 36
See application file for complete search history.

(56) References Cited

U.S. PATENT DOCUMENTS

| | | |
|---|---|---|
| 7,877,290 B1 | 1/2011 | Arsenault et al. |
| 8,069,464 B2 | 11/2011 | Pickens et al. |
| 8,627,390 B2 | 1/2014 | Benjamim et al. |
| 8,824,509 B1 | 9/2014 | Oz et al. |
| 9,264,760 B1 * | 2/2016 | Hundemer ............. H04N 17/00 |
| 2001/0032122 A1 | 10/2001 | Hankla |

(Continued)

OTHER PUBLICATIONS

Vickers, B., et al., "Adaptive Multicast of Multi-Layered Video: Rate-Based and Credit-Based Approaches", Information and Computer Science Department, University of California, National Science Foundation, Grant NCR-9628109. Sep. 1998.

(Continued)

*Primary Examiner* — Pankaj Kumar
*Assistant Examiner* — Sahar Baig
(74) *Attorney, Agent, or Firm* — Thomas A. Ward (57) ABSTRACT

A method (600) for a system (200) for delivering a content offering (102) containing one or more advertisements (331) includes identifying one or more triggers (115,321,117,118) indicating that one or more advertisement avails (326,327, 328) occur in the content offering. After advertisements are obtained, portions (332,333) of the advertisements are multiplexed with portions (334,335) of the content offering occurring between a trigger and a corresponding advertising avail. The portions of the advertisements are delivered to subscriber devices (206) such that all portions are delivered prior to the advertising avail occurring or completing at the subscriber device.

20 Claims, 6 Drawing Sheets

(56) References Cited

U.S. PATENT DOCUMENTS

| | | | |
|---|---|---|---|
| 2008/0060002 A1 | 3/2008 | Noll et al. | |
| 2010/0043022 A1* | 2/2010 | Kaftan | G06Q 30/02 |
| | | | 725/34 |
| 2013/0007226 A1* | 1/2013 | White | H04L 65/4076 |
| | | | 709/219 |
| 2013/0297743 A1 | 11/2013 | Eschet et al. | |
| 2014/0020037 A1* | 1/2014 | Hybertson | H04N 21/2365 |
| | | | 725/109 |
| 2014/0195358 A1* | 7/2014 | Beining | H04N 21/812 |
| | | | 705/14.73 |
| 2014/0258449 A1* | 9/2014 | Holden | H04L 65/60 |
| | | | 709/217 |
| 2016/0073176 A1* | 3/2016 | Phillips | H04N 21/2402 |
| | | | 725/35 |

OTHER PUBLICATIONS

"It's Time to Rethink What You "Know" About Multicast: Tools Now Exist to Deliver on the Promise of IP Multicast for Media Distribution", White Paper document # 2000512-001-EN, Juniper Networks, Inc., Apr. 2013.
Li, X., et al., "Video Multicast over the Internet", IEEE Network, pp. 46-60. Mar./Apr. 1999.
"Personalized Ad Support Goes Over the Top", Seawell Networks Inc., 2012.
Wessels, D., et al., "Internet Cache Protocol (ICP), version 2", RFC 2186, National Laboratory for Applied Network Research/UCSD, Sep. 1997.
Cohen, R., et al., "Scheduling Algorithms for a Cache Pre-Filling Content Distribution Network", Department of Computer Science, Technion, IEEE INFOCOM—INFOCOM , vol. 2, pp. 940-949 vol. 2, 2002.

\* cited by examiner

METHOD AND SYSTEM FOR ADVERTISEMENT MULTICAST PRE-DELIVERY CACHING

BACKGROUND

Technical Field

This disclosure relates generally to multimedia delivery systems, and more particularly to multimedia delivery systems delivering advertising to subscriber devices.

Background Art

Multimedia delivery systems, such as those used by cable operators, content originators, over-the-top content providers, and so forth, deliver multimedia video content, software updates, webpages, and other information to subscriber devices. Frequently, advertising is inserted into the multimedia content. Subscribers watch these advertisements during commercial breaks, which are known as "avails," that occur during the multimedia playback. The insertion of these advertisements provides a revenue source for not only the system provider but for content providers as well. Such advertising helps to offset the cost of creating and delivering programming to subscribers. The traditional way these service providers and system providers earn such revenue is via the insertion of advertisements into avails in broadcast programming.

In traditional advertising insertion, everyone saw the same advertisement. When a show was delivered via broadcast, every subscriber receiving the broadcast saw the exact same advertisement. While this made content delivery easy due to the fact that a single advertisement could be inserted into content delivered to every single subscriber, it was less than satisfactory for the advertiser. Advertisers have long preferred to deliver targeted advertising to people with common interests or demographics. Targeted advertising is the selection of video advertisements for insertion into broadcast programming in such a manner as to match the advertisement to an individual viewer's interest profile.

In some modern content delivery system technologies, attempting to deliver targeted advertising is problematic. For example, in certain broadcast systems where multiple users view common programming, attempting to deliver any form of targeted advertising can cause unwanted bandwidth spikes. Transitioning from delivering a single television program to one hundred users, for example, to delivering individual advertisements to each user causes tremendous bandwidth spikes during advertising avails. It would be advantageous to have improved systems and methods for advertising insertion and delivery.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to inserting advertising into multimedia content streams for delivery using multicast, which can occur in one embodiment in an adaptive bit rate system. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of advertising insertion and delivery using multicast systems as described herein. The non-processor circuits may include, but are not limited to, a data receiver, a data transmitter, signal drivers, clock circuits, power source circuits, and user input devices. As such, these functions may be interpreted as steps of a method to perform precached advertising insertion and delivery via multicast. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As noted above, delivering targeted advertising in many multimedia delivery systems typically requires significant additional bandwidth capacity to deliver advertising to individually targeted groups. In broadcast programming to ten different groups, for example, system bandwidth during commercial avails would need to be ten times higher than when the programming was being delivered. While systems exist to deliver targeted advertising in this fashion, the systems are expensive. Additionally, during broadcast programming, much of the system bandwidth goes unused.

Figure 1:
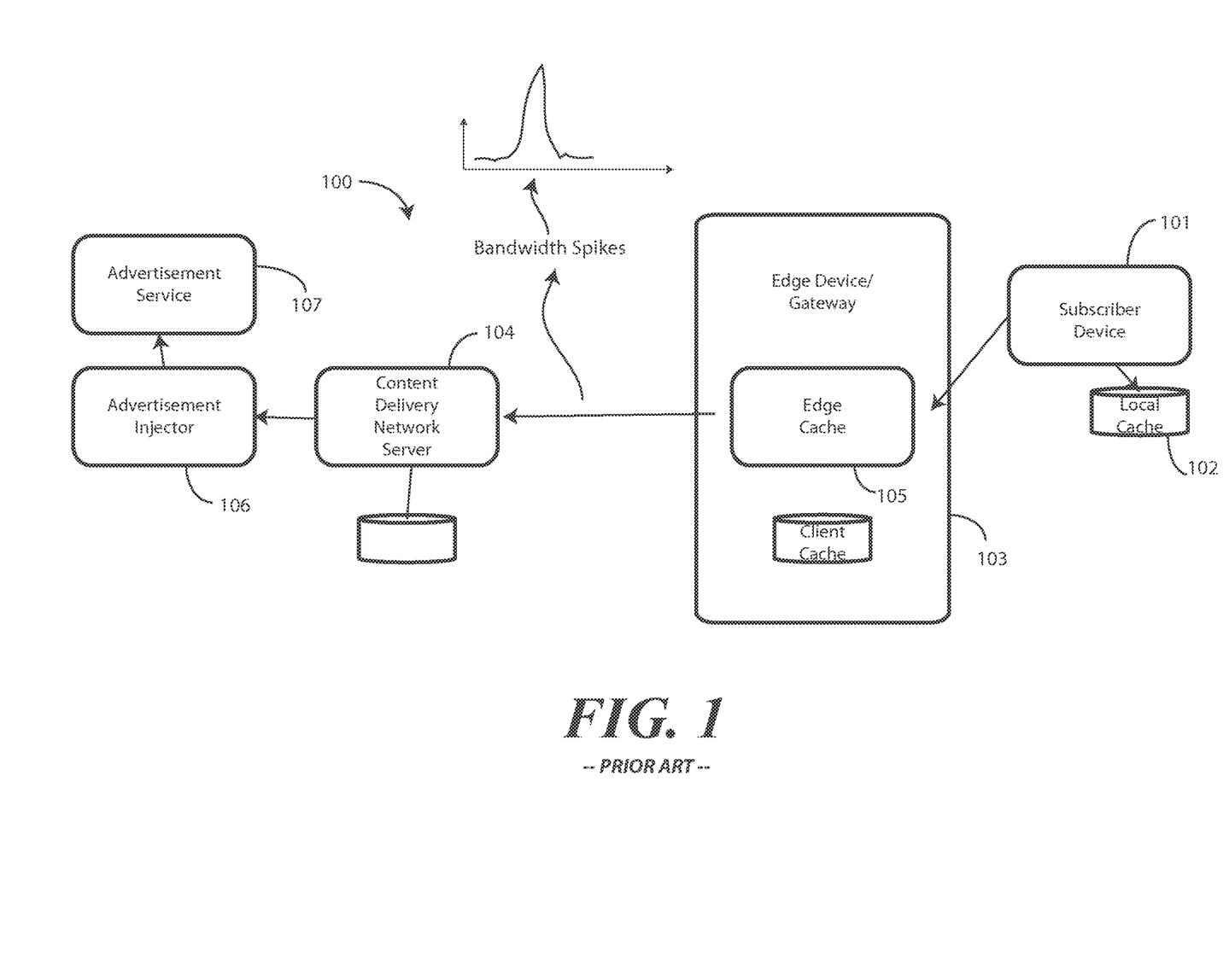
FIG. 1 illustrates a prior art unicast advertisement delivery system.

Turning to FIG. 1, illustrated therein is one prior art system 100 that illustrates this problem. A subscriber device 101 presents multimedia content to a subscriber on a display. When an advertising avail occurs, the subscriber device 101 looks to its local cache 102 to see if the advertisement is stored locally. In conventional systems where every subscriber saw the same national advertisement, the subscriber device 101 would find the advertisement stored within its local cache 102 because the advertisements were delivered in tandem with the multimedia content.

However, in modern systems where advertisements are selected for particular groups or demographics, advertisers prefer to deliver more targeted advertisements. For example, an advertiser may elect to deliver a tire commercial showing cars driving on sunny days to viewers in the south, and cars driving on snowy days to viewers in the north. Consequently, different viewers receive different advertisements. Advertisers are thus unable to deliver a single advertisement to each and every viewer with the content.

Accordingly, when the subscriber device 101 looks to its local cache 102, the advertisement will not be stored there. The subscriber device 101 thus looks to its local gateway 103, which is referred to as an "edge" device, and that receives content and advertising from a content delivery network server 104. The edge device has a local cache 105, but since the advertising is targeted it must be retrieved from a central server. Accordingly, the advertisement is not stored at the edge device either.

In many multimedia content delivery systems, the edge device is a hypertext transfer protocol (HTTP) client of the content delivery network server 104. The edge device thus makes an HTTP GET request of the content delivery network server 104. The content delivery network server 104 then sends another HTTP GET request to an advertisement server 106 to retrieve an advertisement. The advertisement server 106 then sends an HTTP GET request to an advertisement service 107. The advertisement is delivered from the advertisement service 107 to the advertisement server 106 to the content delivery network server 104 to the local gateway 103 to the subscriber device 101. When hundreds of subscriber devices perform this operation at each advertisement avail, bandwidth spikes can be extreme. Some content delivery network service providers are not able to sustain these spikes due to network limitations.

Some other systems attempt to avoid these network spikes and still deliver targeted advertising by delivering advertisements only when bandwidth demands are low. For example, a system operator my elect to deliver advertisements to subscriber devices at night when few customers are using bandwidth on the system. Each advertisement is then stored in memory of a subscriber device for use when bandwidth demand is high, e.g., the next day. The problem with this solution is that each subscriber device must have extremely large amounts of memory in which the nightly advertisement delivery can be stored. If low bandwidth cycles occur only once every twenty-four hours, the subscriber device would need to store enough advertisements for an entire day of programming. Again, this is an expensive way to deliver targeted advertising due to the large memory requirements needed in each subscriber device.

Embodiments of the present disclosure provide an improved system for delivering advertising, including targeted advertising, to subscriber devices. In one or more embodiments, advertising is multicast to a group of devices from a multicast server. Advertisement portions, or advertisement "chunks," can be multiplexed with content delivery such that advertising is delivered piecemeal, with sufficient advertisement portions for a single avail, or portion of an avail, being delivered "just in time" for avail insertion and rendering. This method results in very little memory being required at the subscriber device.

In one or more embodiments, the memory requirement is just that needed to hold enough advertising for a single avail. For example, in a ninety-second avail, three thirty-second advertisements could be stored in Dynamic Random Access Memory (DRAM) or Flash memory. When the avail occurs during play out of the programming, the subscriber device simply retrieves the advertising from this memory and delivers it to the subscriber.

In one or more embodiments, the memory requirement can be further reduced to just that needed to hold one or more upcoming advertisement portions delivered at the time of, or slightly before, the request of the content portions from a subscriber device. For example, if each advertising portion represents two to five seconds of an advertisement, as little as one portion would need to be cached if a new portion was received each time a cached portion was rendered. The portions could be received and drawn from the subscriber device cache on a first in first out basis to reduce the cache requirement to only two to five seconds of advertisement content. Embodiments of the disclosure contemplate that adaptive bitrate streaming protocols frequently divide a content stream into portions of between two and ten seconds.

Advantageously, by multiplexing the advertising into the content and delivering the same via multicast, advertising can be delivered to subscriber devices at a very low data rate, with the delivery ensuring that advertisements corresponding to a particular avail arrive at the subscriber device just before they are needed for insertion into the avail. This results in smoothing network bandwidth loading.

Figure 2:
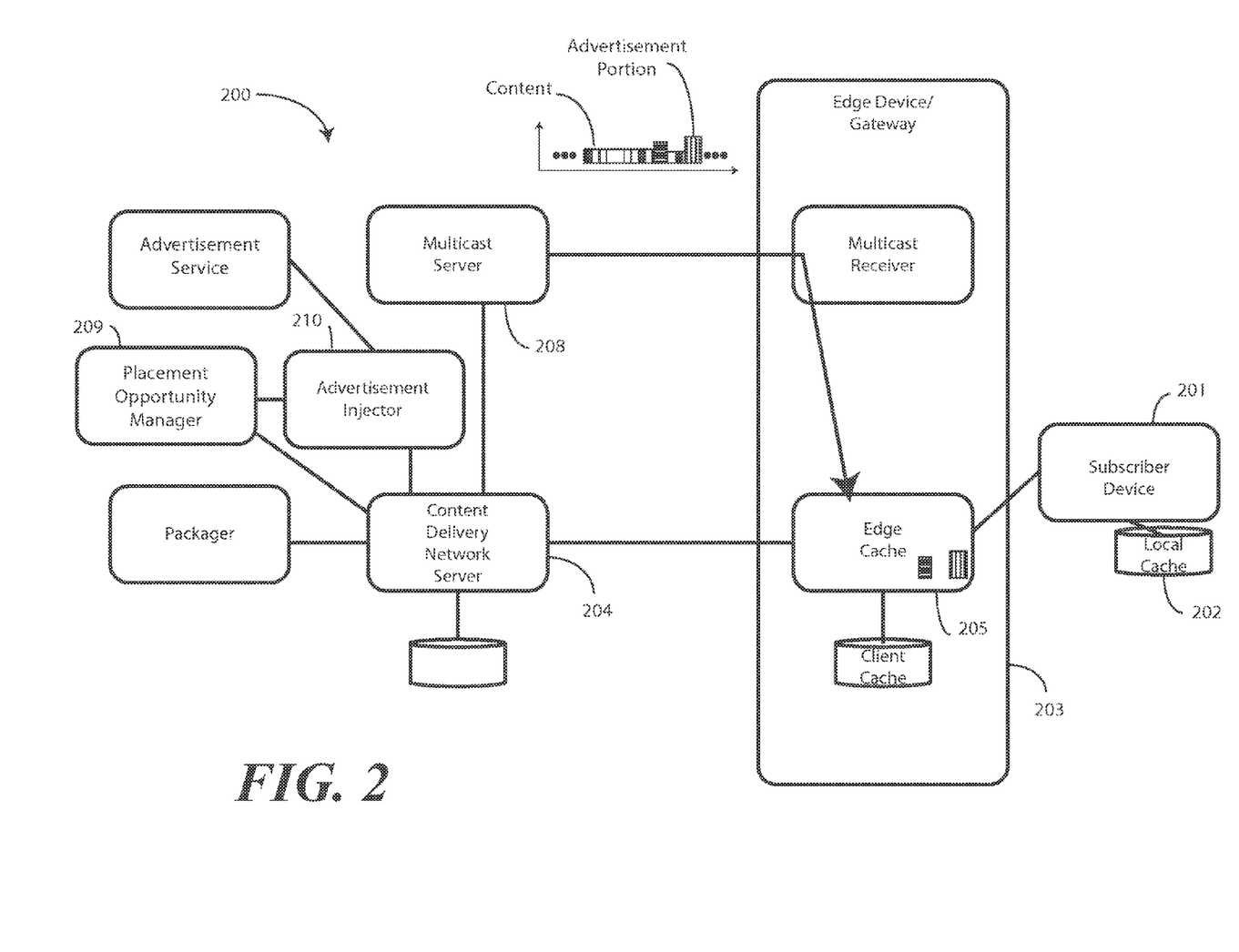
FIG. 2 illustrates one explanatory system in accordance with one or more embodiments of the disclosure.

Turning now to FIG. 2, illustrated therein is a brief overview of one system 200 configured in accordance with one or more embodiments of the disclosure. In one embodiment, a subscriber device 201 requests multimedia content for delivery. Accordingly, the subscriber device 201, through its edge device 203 tunes to a content delivery network server 204. In one embodiment, the content delivery network server 204 operates as an adaptive bit rate server that includes a multicast server 208 to deliver multimedia content to multiple subscriber devices. In one embodiment, the subscriber device 201 uses an Internet Group Management Protocol command to tune to the content delivery network server 204. Other methods of subscribing a subscriber device 201 to a content delivery network server 204 to receive content will be obvious to those of ordinary skill in the art having the benefit of this disclosure.

One or more processors or controllers in a content delivery network server 204 can then determine if there is sufficient capacity to provide the requested services to the subscriber device 201. In one embodiment, this decision determines not only whether the content can be delivered to the subscriber device 201, but whether content with advertising multiplexed therein can be delivered from the multicast server 208 such that all portions of advertising required for a particular avail are delivered during a duration prior to the corresponding advertisement avail occurring or completing in the content at the subscriber device 201.

Illustrating by example, in one embodiment a two-minute advertising avail occurs during content delivery every hour. Accordingly, the content delivery system would need to delivery not only the content itself to the subscriber device 201, but all portions of two minutes of advertising as well. In one embodiment, the two minutes of advertising can be divided into portions, multiplexed with portions of the content, and delivered across a duration occurring between avails. Thus, if each avail occurred two minutes before the hour, the portions of the two minutes of advertising could be selectively delivered between the hour and two minutes prior to the next hour as system bandwidth allows. However, all portions of the two minutes of advertising would need to be delivered prior to the avail completing at the subscriber device 201 if they are to be inserted into the avail. As will be shown in more detail below, if the portions do not reach the subscriber device in time, one or more embodiments provides for a default advertisement as a backup.

The two minutes of advertising could be delivered prior to the avail occurring at the subscriber device 201 in one embodiment. In another embodiment, where advertisement portions are being delivered as they are used, all portions of the advertisement would need to be delivered to the subscriber device 201 such that the last portion was delivered before the avail completes at the subscriber device 201. Accordingly, it can be drawn from the local cache 202 or the edge cache 205 for presentation during the avail.

If the content delivery network server 204 can accommodate the requested service, the system then multiplexes the portions of the advertisement with portions of the content to "trickle feed" the appropriate advertising from a multicast server 208 to the subscriber device 201 for storage in a local cache 202.

In short, rather than handling all the HTTP GET commands occurring in the prior art system (100) of FIG. 1, which cause tremendous bandwidth spikes, the multicast server 208 of the system 200 in FIG. 2 pushes and pre-caches advertising into the local cache 202 of the subscriber device 201 or the edge cache 205 of the edge device 203 by multicasting portions of the advertisement between avails. This trickle delivery works to smooth bandwidth loading and demand on the network. When the avail occurs, the subscriber device 201 inserts the locally stored advertising into the avail for delivery to a client.

In one or more embodiments, the system 200 of FIG. 2 accommodates adaptive bit rate content delivery. In such an embodiment, the advertising delivered by this trickle method can be directed to specific users in accordance with the adaptive bit rate protocol that employs the Hypertext Transfer Protocol to establish a direct communication connection between a subscriber device 201 and a content delivery network server 204 to deliver content.

In one embodiment, the system 200 can identify one or more triggers associated with a content offering that indicate that an advertisement avail will occur within the content offering. The triggers can take many forms. In the example above for instance, where two minutes of advertising occur every hour, with each avail occurring two minutes before the hour, the trigger could be the conclusion of an avail. In another embodiment, the trigger can be the beginning of the content delivery. In another embodiment, the trigger can be the act of a subscriber device tuning to a multicast server. In another embodiment, the trigger can be a rule construct that is applied to all content offerings. In yet another embodiment, the trigger could be a Society of Cable Telecommunications Engineers (SCTE)-35 packet. A transcoder or other device in the system can identify one or more triggers associated with a content offering. In one embodiment, each trigger indicates that one or more advertisement avails occur in the content offering subsequent to, i.e., after, the one or more triggers.

A placement opportunity manager 209 can then determine a duration until at least one advertisement avail occurs or completes in the content offering at the subscriber device 201. In one embodiment, the duration is the amount of time between the trigger being identified and the corresponding avail occurring or completing at the subscriber device. This duration can include latency due to the subscriber device requesting content, the content being delivered, and so forth.

An advertisement injector 210 operable with the placement opportunity manager 209 can then obtain at least one advertisement to insert in the at least one advertisement avail. In one or more embodiments, the advertisement is a targeted advertisement intended for a user or group of users having a common demographic, geography, or interest.

The advertisement injector 210 can then multiplex portions of the advertisement(s) with portions of the content offering occurring between the trigger and the advertisement avail. The multicast server 208, which in one embodiment is an adaptive bit rate multicast server, can then deliver the portions of the advertisement to a plurality of subscriber devices. Where the advertisement is a targeted advertisement, each subscriber device of the plurality of subscriber devices may be associated with a subscriber having the common demographic, geography, or interest.

In one embodiment, this data is delivered as a multicast adaptive bit rate data stream. In one embodiment, the data stream is delivered such that all portions of the advertisement are delivered during the duration and prior to the advertisement avail occurring or completing in the subscriber device 201. The subscriber device 201 caches these portions in local cache 202 and then inserts the advertisement into the avail when it occurs.

Embodiments of the disclosure advantageously provide just-in-time delivery of advertising that can be stored locally in a subscriber device 201 in a very small amount of memory. Rather than delivering numerous different advertisements for a variety of content offerings to a subscriber device 201, which requires very large and costly amounts of memory, in one embodiment of the disclosure only advertising for a tuned service are delivered and cached.

Thus, for a ninety-second advertisement avail, the maximum memory requirement in the local cache 202 of the subscriber device 201 is an amount of storage for three thirty-second commercials. Where advertisement portions are delivered as they are consumed, the memory requirement is even less. This results in a tremendous memory savings in the local cache 202 of the subscriber device 201 compared to prior art systems. Unlike prior targeted advertising solutions, embodiments of the disclosure are suitable for small static memory devices and do not require subscriber device hard disks or other large storage devices.

Moreover, embodiments of the disclosure provide an advertiser with the ability to insert targeted advertising into preferred programming and at preferred time of day windows. Since advertisements can be delivered just in time, advertisers are assured that their advertisements are delivered during a particular broadcast, movie, or program. This is in contrast to prior art techniques of delivering advertising at night, for example, and inserting them into any number of shows the following day. With embodiments of the present disclosure, the context of for which content offering the advertisements are being cached is understood due to the fact that advertising is being delivered during that very content offering. Advantageously, this feature increases the targeting reach due to the fact that for many content offerings collective viewers share similar demographics, such as age group or interest. Accordingly, embodiments of the disclosure enable targeted advertisements to reach a larger target population in most advertising avails, further improving both the multicast transmission efficiency as well as the advertiser's reach.

Additionally, embodiments of the disclosure advantageously do not cause network bandwidth spikes during targeted advertising insertions. System service providers can manage advertising delivery to smooth network data demands by trickle feeding multiplexed advertising portions to subscriber devices with content portions across the duration defined between the trigger and the avail. Accordingly, the delivery of these advertisements in this manner increases overall network efficiency.

Figure 3:
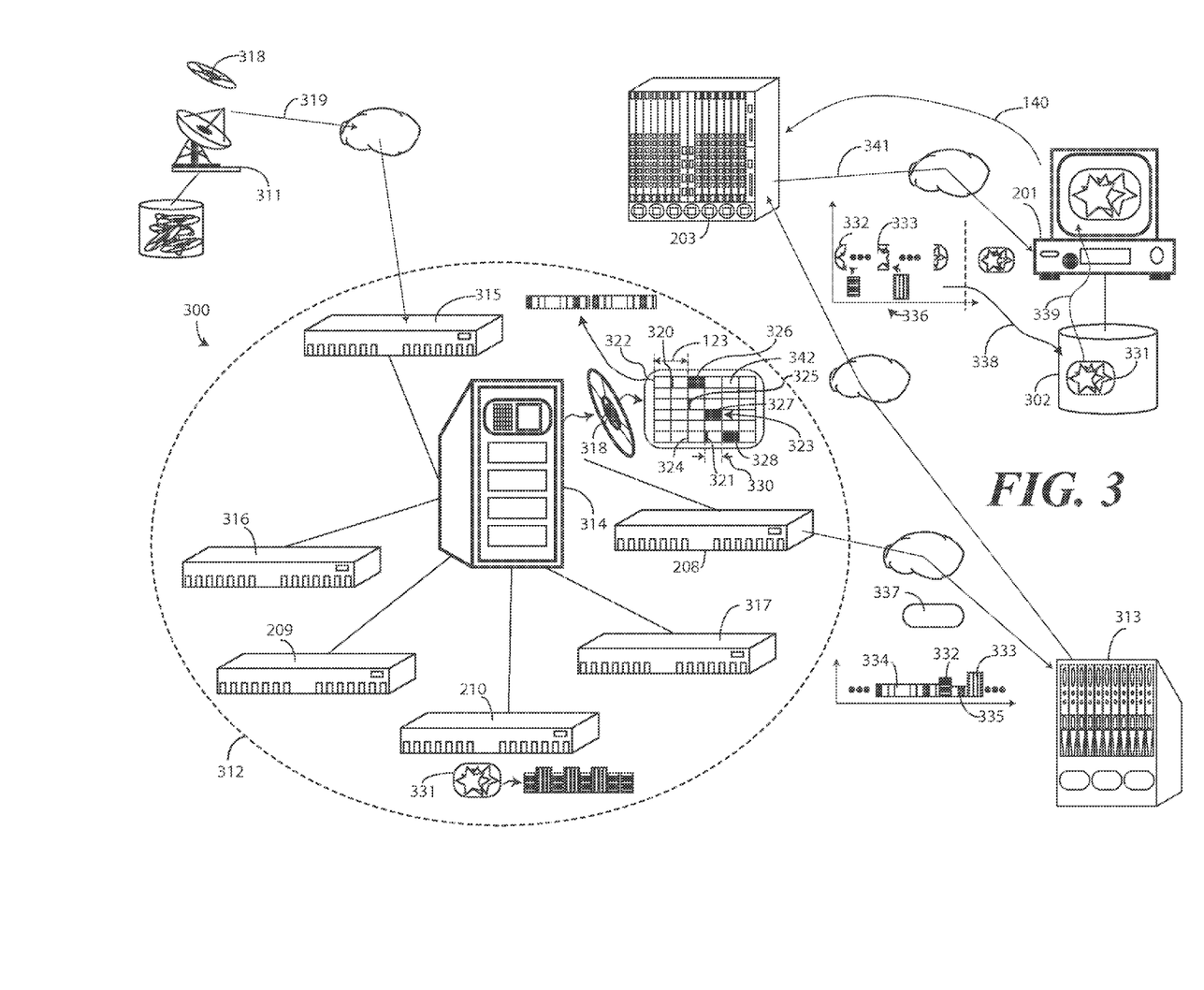
FIG. 3 illustrates another explanatory system in accordance with one or more embodiments.

Turning now to FIG. 3, illustrated therein is a more detailed view of one explanatory content delivery system 300 configured in accordance with one or more embodiments of the disclosure. The content delivery system 300 includes a content provider 311, a server structure 312, one or more intermediate network servers 313, an edge device 203, and one or more subscriber devices 201. The structure of the content delivery system 300 of FIG. 3 is explanatory only. Other configurations will readily be obvious to those of ordinary skill in the art having this disclosure.

In one embodiment, the server structure 312 includes a central server 314 that is operable with one or more other server structure devices. In this embodiment, the other server structure devices include a transcoder 315, a packager 316, a placement opportunity manager 209, an advertisement injector 210, a multicast controller 317, and a multicast server 208.

In one embodiment, the central server 314 is a content delivery management device comprising, but not limited to, one or more processors or processing units, a system memory, and one or more communication bus links coupling various system components including the one or more processors to the system memory. The system bus can take any number of possible bus structures, including a memory bus or memory controller, a peripheral bus, an accelerated graphics port, and a processor or local bus using any of a variety of bus architectures.

The system memory of the central server 314 can be any of a variety of computer readable media. Such media can be any available media that is accessible by the central server 314 and includes both volatile and non-volatile media, removable and non-removable media. The system memory includes computer readable media in the form of volatile memory, such as random access memory (RAM), and/or non-volatile memory, such as read only memory (ROM). The system memory typically contains computer readable instructions and/or program modules such as operating systems and/or application software that are accessible to and/or are presently operated on by the central server 314.

A content provider 311 delivers content in the form of one or more content offerings 318 to the server structure 312. In one embodiment, the content offering 318 can comprise, for example a television program or movie, which has been encoded from a content provider feed 319. The content offering 318 can be digitally compressed video content that can be demultiplexed and stored in a convenient format such as MPEG, MPEG 2, or MPEG 4. It will be clear to those of ordinary skill in the art having the benefit of this disclosure that other types of content could be used with the systems, methods, and devices described herein.

While only one content provider 311 and content provider feed 319 are shown for simplicity, in many embodiments the server structure 312 would have numerous content provider feeds from multiple content providers. The server structure 312 may also receive program content streaming from one or more video servers for delivery to the subscriber devices 201 as well.

The server structure 312 receives the content offering 318 through one or more switches at a transcoder 315. The transcoder 315 facilitates receipt of the content offering 318 so that it can be stored in local memory at the server structure 312 for subsequent delivery to the one or more subscriber devices 201.

In one embodiment, the transcoder 315 is operable to identify one or more triggers 320,321,322,323,324,325 associated with a content offering 318. In one embodiment, each trigger 320,321,322,323,324,325 indicates that one or more advertisement avails 326,327,328 occur in the content offering 318 subsequent to the one or more triggers 320,321,322, 323,324,325.

The triggers 320,321,322,323,324,325,140 can take different forms. Illustrating by example, trigger 320 is content offering boundary, which is the beginning of the content offering 318 in this illustrative embodiment. Trigger 323 is an avail boundary, and more specifically the end of advertisement avail 327 in this illustrative embodiment. Trigger 322 comprises a predefined rule set applied to the content offering 318. For example, the predefined rule set may indicate that three advertisement avails 326,327,328 should occur during a predefined time period, such as one hour, or during a particular content offering 318. Trigger 140 represents a subscriber device 201 tuning to a channel, address, or resource locator of the multicast server 208.

In one embodiment, the triggers 320,321,322,323,324, 325 can comprise markers in the content offering 318 itself. For instance, triggers 320,321 are Society of Cable Telecommunications Engineers (SCTE)-35 cue packets placed within the content offering 318. Trigger 320 may comprise, for example, an SCTE-35 cue packet in an MPEG-2 stream. While triggers 320,321,322,323,324,325 are some examples of triggers suitable for use with embodiments of the disclosure, others will readily be obvious to those of ordinary skill in the art having the benefit of this disclosure. For example, other triggers may include a Dual Tone Multi-Frequency (DTMF) tone sequence in a digital or analog content offering, a Gigabit PoE Injector (GPI) contact closure in a GPI relay from the equipment such as a satellite receiver, or via some other trigger.

Once the transcoder 315 identifies a trigger 320,321,322, 323,324,325 indicating that one or more advertisement avails 326,327,328 occur within the content offering 318, the transcoder 315 can alert the placement opportunity manager 209 that the triggers 320,321,322,323,324,325 have been identified. The placement opportunity manager 209 then estimates a duration 123,330 until an advertisement avail 326,327 following the trigger will occur in the content offering 318 at the subscriber device 201. This duration 123,330 can include latencies in the content delivery system 300, including content requests by the subscriber device 201, delivery latency, and so forth.

In one or more embodiments, this duration 123,330 will be less than sixty minutes due to the fact that many programs are sixty minutes in length. Where, for example, the trigger 322 is the content boundary, the placement opportunity manager 209 can calculate the amount of time between the content boundary and when the next advertisement avail 326 will occur or complete in the subscriber device 201. This amount of time can be inclusive of system latencies.

Where the trigger 321 is an SCTE-35 cue packet, the placement opportunity manager 209 can calculate the amount of time between the SCTE-35 cue packet and when the next advertisement avail 327 is likely to occur or complete in the subscriber device 201. This duration 123, 330, in one embodiment, represents the amount of time within which an advertisement can be delivered to a subscriber device 201 so as to provide just-in-time delivery for insertion of the advertisement into the advertisement avail 326,327,328.

In one embodiment, any of the central server 314, transcoder 315, placement opportunity manager 209, or combinations thereof can then notify the advertisement injector 210 that one or more advertisements 331 are needed for a particular advertisement avail 326,327,328. The advertisement injector 210 can be operable with, or can include, an advertisement selector to select or receive advertisements. In one embodiment, the central server 314, transcoder 315, the placement opportunity manager 209, or combinations thereof sends an "advertisement needed" message, such as an SCTE-30 message to the advertisement injector 210.

In one embodiment, when the advertisement injector 210 receives the "advertisement needed" message, it may determine which content offering 318 is being delivered to a particular subscriber device 201. The advertisement injector 210 may use this information and/or other advertising information or schedules to select the proper advertisement(s) 331.

The advertisement injector 210 may identify one or more advertisements 331 for insertion into any one advertisement avail 326,327,328. For example, where the advertisement 331 is targeted for a specific geographic region, plurality of subscriber devices 201, demographic, or other group, the advertisement injector 210 or its corresponding advertising selector can select an advertisement 331 as a function of the demographic factor common to each subscriber device of this plurality of subscriber devices 201.

In one or more embodiments, the server structure 312 has stored therein data corresponding to demographics associated with subscribers using each subscriber device 201. The server structure 312 also has knowledge of which subscriber devices 201 are currently receiving content from the edge device 203. Accordingly, advertisement injector 210 in one or more embodiments can use this data to optimize advertisement selection such that targeted advertisements most appropriate for the current viewers are selected to provide additional functionality.

In one embodiment, the advertisement injector 210 only selects enough advertisements 331 to fill a single advertisement avail, e.g., advertisement avail 326, to keep memory requirements in the subscriber device 201 to a minimum. For example, if advertisement avail 326 is a two-minute commercial break, the advertisement injector 210 may select four thirty-second advertisements.

Once the necessary advertisements 331 are selected, in one embodiment the advertisement injector 210 multiplexes portions 332,333 of the advertisement 331 with portions 334,335 of the content offering 318 for delivery to a subscriber device 201 during the duration 330 occurring between the trigger 321 and the corresponding advertisement avail 328 occurring or completing in the subscriber device 201. The portions 332,333 of the advertisement 331 are then delivered to the subscriber device 201 from the multicast server 208 during the duration 330 so that they are available just in time to be inserted into the content offering 318 when the advertisement avail 328 occurs at the subscriber device 201.

In one embodiment, the portions 332,333 of the advertisement 331 are delivered to the subscriber device 201 from the multicast server 208 using an adaptive bit rate protocol. While traditional multimedia delivery networks used a real time streaming protocol to stream video in which a user may employ simple commands at the subscriber device 201 to play, fast-forward, and rewind content, new streaming protocols have been developed to make media delivery across a network more efficient. One such protocol is one of the many hypertext transfer protocol adaptive bit rate streaming standards, such as the hypertext transfer protocol dynamic streaming protocol, the Smooth Streaming.sup.TM protocol, the MPEG-DASH protocol, or other adaptive bitrate streaming protocols.

In adaptive bit rate streaming systems, multiple files are created for a content offering 318. Each file is encoded at different data rates, and is then divided into portions 334,335 that represent short "chunks" of the content offering 318. Each portion 334,335 may represent two to ten seconds of the content offering 318. The various segments are loaded at the multicast server 208.

Embodiments of the disclosure contemplate that if the content delivery system 300 waits for an advertisement avail 326, 327, 328 to deliver an advertisement 331 directed to a particular group of subscriber devices 201, the required bandwidth will increase dramatically during each advertisement avail 326,327,328 as shown above with reference to FIG. 1. To prevent this, in one embodiment the content delivery system 300 delivers, with the multicast server 208 operable with the advertisement injector 210, the portions 332,333 of the advertisement 331 to a plurality of subscriber devices 201 as a multicast adaptive bit rate data stream 131 such that all portions 332,333 of the advertisement 331 are delivered during the duration between a trigger 321 and an advertisement avail 328, and prior to the advertisement avail 328 occurring or completing at the subscriber device 201.

For example, the multicast server 208 may insert up to a couple of minutes of advertising into content offerings per hour such that the advertising is delivered to the subscriber device 201 just before they needed for insertion into an advertisement avail 328. Thus, in one embodiment the subscriber device would store in its local cache 302 between two to ten seconds and one to two minutes of advertising seconds of the advertisement avail 327 in a cache 302 that can be a small amount of RAM or flash memory. In one or more embodiments, this will be less than fifty megabytes of data for storage in the local cache 302 of the subscriber device 201.

These portions 332,333 are trickled 336 to the cache 302 of the subscriber device 201 so that overall bandwidth increases minimally without the large spikes that occur with real time delivery. Embodiments of the disclosure therefore level bandwidth demand by spreading demand peaks out over time. With a very small increase in bandwidth across the duration over the nominal multicast rate the advertisements 331 are delivered, bandwidth demand peaks are removed, and only a small cache 302 in the client device is required to store advertising.

In one embodiment, along with the advertising, the multicast server 208 also delivers a cache notification message 337 that instructs the subscriber device 201 to store 338 the portions 332,333 of the advertisement in its cache 302 until the corresponding advertisement avail 327 occurs. In one embodiment, cache notification message 337 also instructs the subscriber device 201 to insert 339 the advertisement 331 into the content offering 318 when the advertisement avail 327 occurs.

As the advertisement 331 is being delivered during a duration 330 occurring between a trigger 321 and an advertisement avail 328 occurring at the subscriber device 201, in one embodiment the cache notification message 337 also includes a cache policy 340 that identifies a minimum duration during which the portions 332,333 of the advertisement 331 are to be cached in the cache 302 of the subscriber device 201.

It should be noted that while the discussion to this point refers to multiplexing portions 332,333 of an advertisement 331 with portions 334,335 of the content offering 318 and delivering that to a subscriber device 201 from a multicast server 208 for storage in a local cache 302 of the subscriber device 201. However, the exact same process could be performed to multiplex portions 332,333 of an advertisement 331 with portions 334,335 of the content offering 318 and delivering that data stream 131 to the edge device 203 as well. In such an embodiment, the subscriber device 201 could request the advertisement 331 from the edge device 203 in real time. While this would cause the bandwidth to increase at the communication link 341 between the edge device 203 and the subscriber device 201, it is contemplated that each edge device 203 serves far fewer subscriber devices than, for example, does the multicast server 208. Accordingly, while there may still be bandwidth demand spikes in the system, they would be far smaller than where the multicast server 208 unicasts advertisements 331 to subscriber devices 201.

It should also be noted that in one or more embodiments the content offering 318 can include one or more default advertisements 342. These default advertisements 342 could be general in nature and suitable for presentation to all subscriber devices. Accordingly, in the event that delivery of the portions 332,333 of the targeted advertisement 331 failed to occur prior to an advertisement avail 327 occurring or completing in the subscriber device 201, the subscriber device 201 could simply present the default advertisement 342 instead. When presenting default advertisements 342, there is no need to do anything special to play them. To the contrary, they simply do not have a targeted advertisement inserted over the default advertisement 342. Accordingly, the default advertisements 342 play normally.

Alternatively, upon failure of delivery of targeted advertisement 331, the subscriber device 201 could fetch the advertisement as described in FIG. 1. Note that the default advertisement 342 can, but need not be pre-delivered with the content offering 318. Thus, where bandwidth or quality of service or other factors precluded delivery the portions 332,333 of the advertisement 331 to the subscriber device 201 such that all portions 332,333 of the advertisement 331 are delivered during the duration 330 and prior to the advertisement avail 327 occurring, a subscriber would instead see a default advertisement 342 included with the content offering 318. In one or more embodiments, the subscriber device 201 can report back to the advertisement injector 210 regarding whether a targeted advertisement or another advertisement, such as the default advertisement, was presented to a subscriber. Not only does this report provide an indication of system performance, but it also facilitates correct advertising billing and advertisement contract fulfillment.

Figure 4:
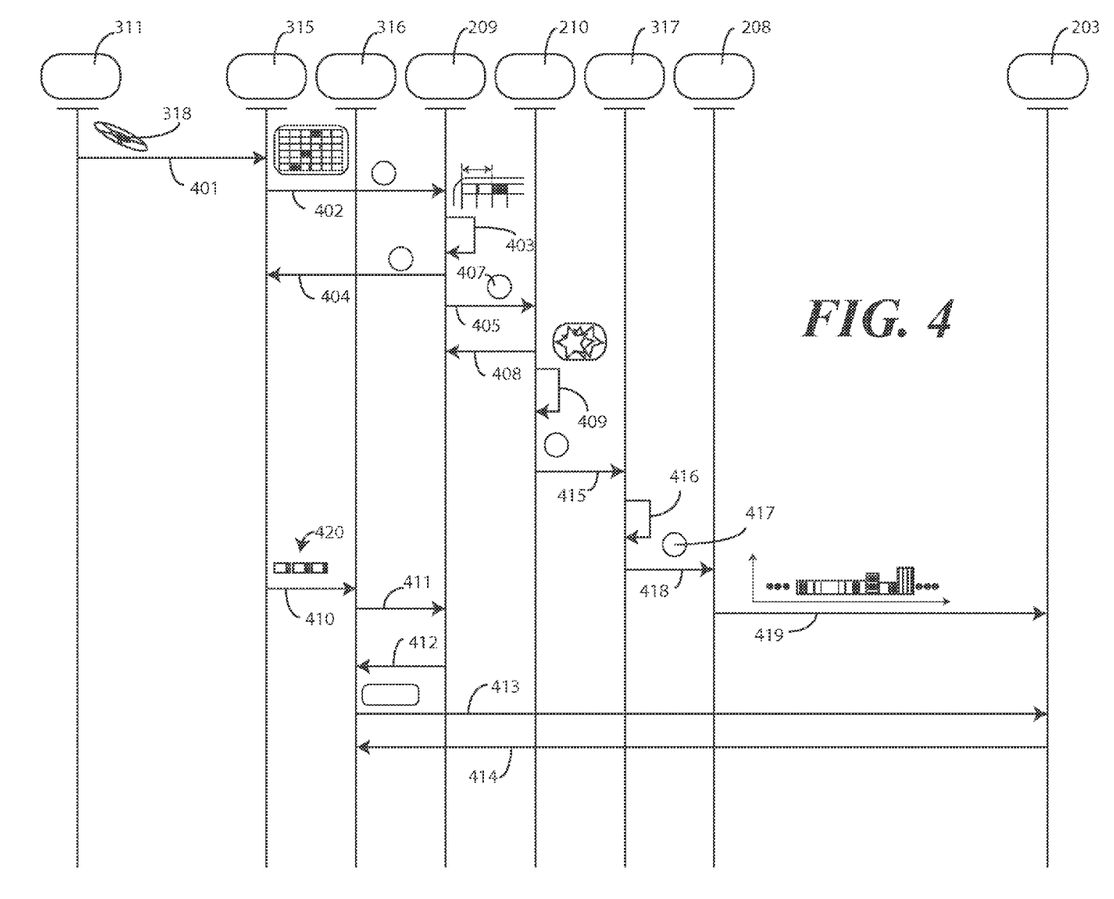
FIG. 4 illustrates one explanatory signal flow diagram in accordance with one or more embodiments of the disclosure.

Turning now to FIG. 4, illustrated therein is a signal flow diagram for one embodiment of a content delivery system in accordance with one or more embodiments of the disclosure. Initially, a content provider 311 delivers a content offering 318 to a transcoder 315 of a server structure 312. The transcoder 315 receives a content offering 318. In one embodiment, the content offering 318 comprises a video stream encoded into a digital content stream such as MPEG-2 by an encoder. The encoder may be located, for example, with the program creator, broadcast originator, content provider 311, or service provider.

The transcoder 315 then identifies, in one embodiment, one or more triggers associated with the content offering 318. In one embodiment, the content offering 318 has associated therewith one or more triggers (320,321), which can be in the form of SCTE-35 cue packets. In one embodiment each trigger indicates that one or more advertisement avails occur in the content offering 318 subsequent to the one or more triggers. By identifying the triggers, the transcoder 315 attempts to find the earliest point the remaining components of the system can make an advertising selection and delivery decision that delivers a selected advertisement to an edge device 203, which can be a subscriber device or an origin server, with an adaptive bit rate multicast server 208. Where an SCTE-35 cue packet serves as a trigger, the transcoder 315 can include an Event Signaling and Management (ESAM) interface to detect these triggers. As noted above, other triggers can be used as well.

Regardless of which triggers are used, when a trigger is identified, the transcoder 315 notifies 402 the placement opportunity manager 209 of this fact by forwarding a message to the placement opportunity manager. The placement opportunity manager 209 then determines 403 a duration until at least one advertisement avail occurs in the content offering 318. In one embodiment, the placement opportunity manager 209 generates break marker information, such as a unique signal identifier, during this process. The duration and any other information associated with the advertisement avail is then communicated 404 back to the transcoder 315 in one or more embodiments. The signal flow of FIG. 4 thus illustrates one embodiment of identifying a trigger at an optimal point where the placement opportunity manager 209 is aware of an advertisement avail.

In one embodiment, the placement opportunity manager 209, in addition to doing its normal work generating breaks in the content offering for each trigger, then communicates 405 a need for one or more advertisements to the advertisement injector 210. In one embodiment, this communication comprises delivering an "advertisement needed" message 407 to the advertisement injector 210. The advertisement injector 210 can then acknowledge 408 this request with a response.

In one embodiment, the advertisement injector 210 receives or has data indicating which subscriber devices are receiving the content offering 318. For example, the advertisement injector 210 has data indicating how many subscriber devices have established sessions with the multicast server 208 due to the fact that each subscriber device 201 has an open session to a manifest manipulator operating at the server structure (312). The advertisement injector 210 additionally has data of the channel the content offering 318 is being delivered on, the identifier of the client device, and so forth so that an advertisement can be specifically selected for a particular user or a group of users sharing a common location, geography, demographic or other characteristic.

When the advertisement injector 210 receives the advertisement needed message 407 it may apply this information to select the proper advertisement. In one embodiment, the advertisement injector 210 then works with an advertising decision service, which is resident at the advertisement injector 210, or is in communication with the advertisement injector 210, to determine what advertisement is to be inserted into the advertisement avails of the content offering 318. In one embodiment, this decision is based upon demographic information associated with the subscriber device to which the advertisement will be delivered.

The advertisement injector 210 may also apply one or more advertising schedules and/or other information as part of the process of selecting an advertisement(s). The advertisement injector 210 may identify one or several advertisements to be inserted into advertisement avails of the content offering 318. The advertisement injector 210 then obtains 409 at least one advertisement for insertion into a corresponding advertisement avail.

The advertisement injector 210 can then notify 415 the multicast controller 317 with a pre-delivery advertisement notification where the various files are stored, including the content offering 318 and the advertisements. Said differently, once the decision of which advertisement is to be used has been made, the advertisement injector 210 sends a message to the multicast controller 317. In one embodiment, the message is known as a pre-delivery advertisement notification that contains a list of advertisement uniform resource locators. The pre-delivery advertisement notification can also include a popularity ranking for the selected advertisement so that the multicast controller 317 can use this information to determine a number of edge devices 203 tuned in versus advertisement popularity so that it can decide whether to multicast the advertisement through the multicast server to the edge device 203.

The multicast controller 317 can then decide 416 whether sufficient resource availability exists to deliver, with the adaptive bit rate multicast server 208, the multiplexed portions of the advertisement to the edge device 203 such that all portions of the advertisement are delivered prior to the advertisement avail occurring or completing at a subscriber device (201) served by the edge device 203. If so, the multicast controller 317 then tells the multicast server 208 to distribute a cache notification message 417. Accordingly, a cache notification message 417 is delivered to the multicast server 208 that includes the file list, cache policy, and other information. In one embodiment, the cache notification message 417 includes a cache policy telling the edge device 203 how long to cache the selected advertisement. The multicast server 208 then delivers 419 the multicast adaptive bit rate stream to the edge device 203 as previously described.

Meanwhile, the transcoder 315 can deliver 410 a transcoded data stream 420 to the packager 416. In one embodiment, the transcoded data stream 420 includes the marker information generated by the placement opportunity manager 209 that was delivered 404 to the transcoder 315. In one embodiment, the packager 316 then interrogates 411 the placement opportunity manager for information for insertion into the manifest file that will accompany the adaptive bit rate streams that are delivered to the edge device 203 via the multimedia delivery network.

This information can include signal information, file location, advertisement avail information, advertisement delivery information, caching policies, and other information. In one embodiment, the cache notification message will include instructions for the edge device 203 to store portions of the advertisement until the at least one advertisement avail occurs. In one embodiment, the cache notification message can include an instruction instructing insertion of the advertisement cached in the edge device 203 into the content offering 318 when the at least one advertisement avail occurs. In one embodiment, the cache notification message can include a cache policy identifying a minimum duration during which the portions of the advertisement are to be cached in the edge device 203.

The packager 416 can then create the manifest file. It can then publish 413 the manifest to the multimedia delivery network, which can include publication to one or more edge devices 203. The multimedia delivery network and/or edge devices 203 can then acknowledge 414 the publication to the packager 316.

Figure 5:
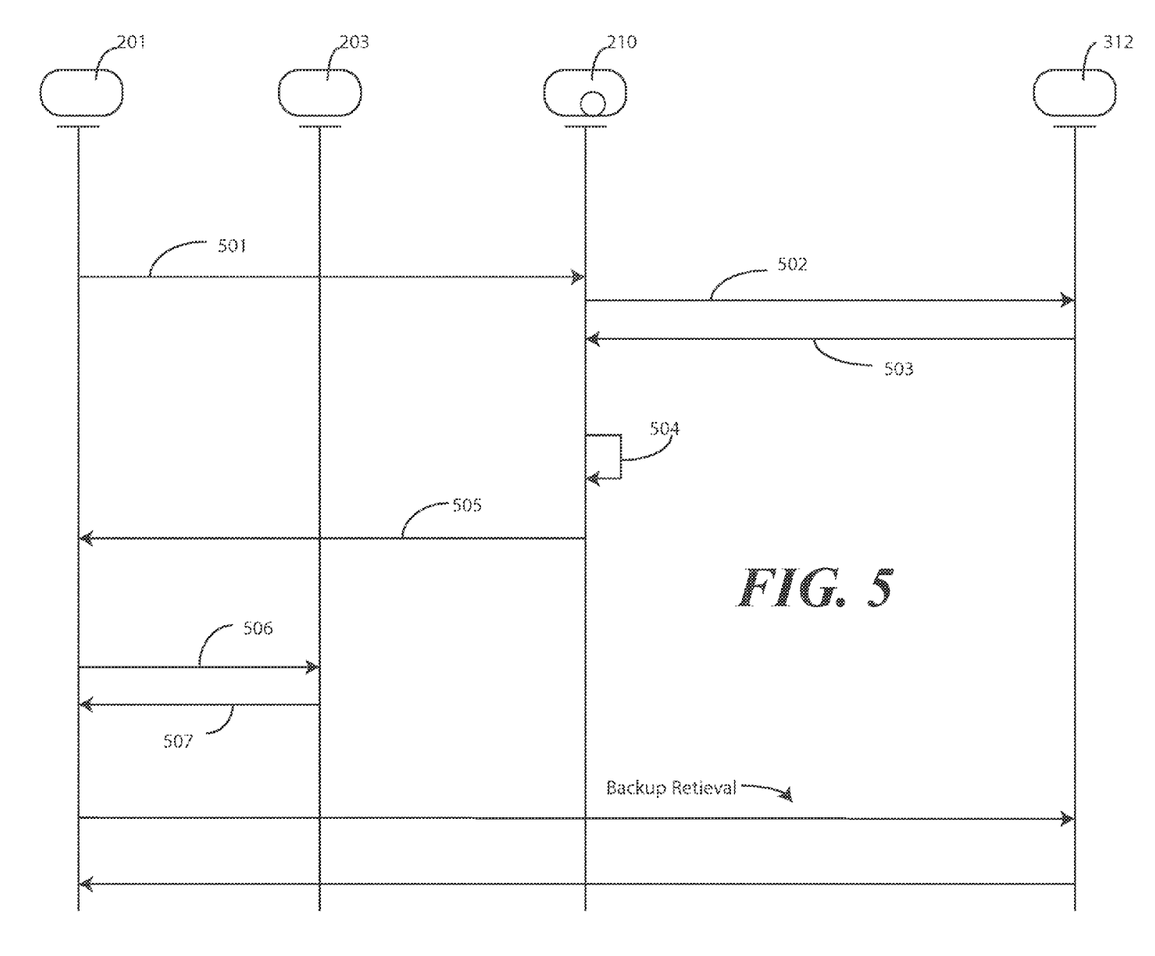
FIG. 5 illustrates another explanatory signal flow diagram in accordance with one or more embodiments of the disclosure.

Turning now to FIG. 5, the remainder of the content delivery process is shown. The subscriber device 201 sends 501 a get manifest request to the advertisement injector 210. The advertisement injector 210 then sends 502 a corresponding get manifest request to the server structure 312. The server structure 312 then delivers 503 the manifest to the advertisement injector 210. The advertisement injector 210 then manipulates 504 the manifest by inserting uniform resource locators for selected advertisements. The advertisement injector 210 then returns 505 the manipulated manifest to the subscriber device 201.

When an advertisement avail occurs at the subscriber device 201, the subscriber device 201 looks for the advertisement portions in its local cache, which could be within the subscriber device 201, located proximately with the subscriber device 201, or in an edge device operable with the subscriber device 201. If they are not there, the subscriber device 201 requests 506 the advertisement portions from the edge device 203. This is in contrast to prior art systems where the advertisements would be requests directly from the server structure 312. Since the advertisement portions have been multicast to the edge device 203, they can be retrieved 507 locally rather than from the server structure 312, thereby saving bandwidth. If for some reason the advertisement portions are not at the edge device 203, they can be retrieved from the server structure 312 as a backup measure.

As shown and described in FIGS. 4-5, once the placement opportunity manager 209 detects one or more triggers, it makes an advertisement decision request to the advertisement injector 210. The advertisement injector 210 can then apply various information, such as the number of clients watching a content offering 318, the popularity of advertisements in a campaign system, or other information, and make a decision regarding which are the most important advertisements, which are the most popular advertisements, and so forth to determine which advertisements are trickled to the edge device 203 for caching.

Figure 6:
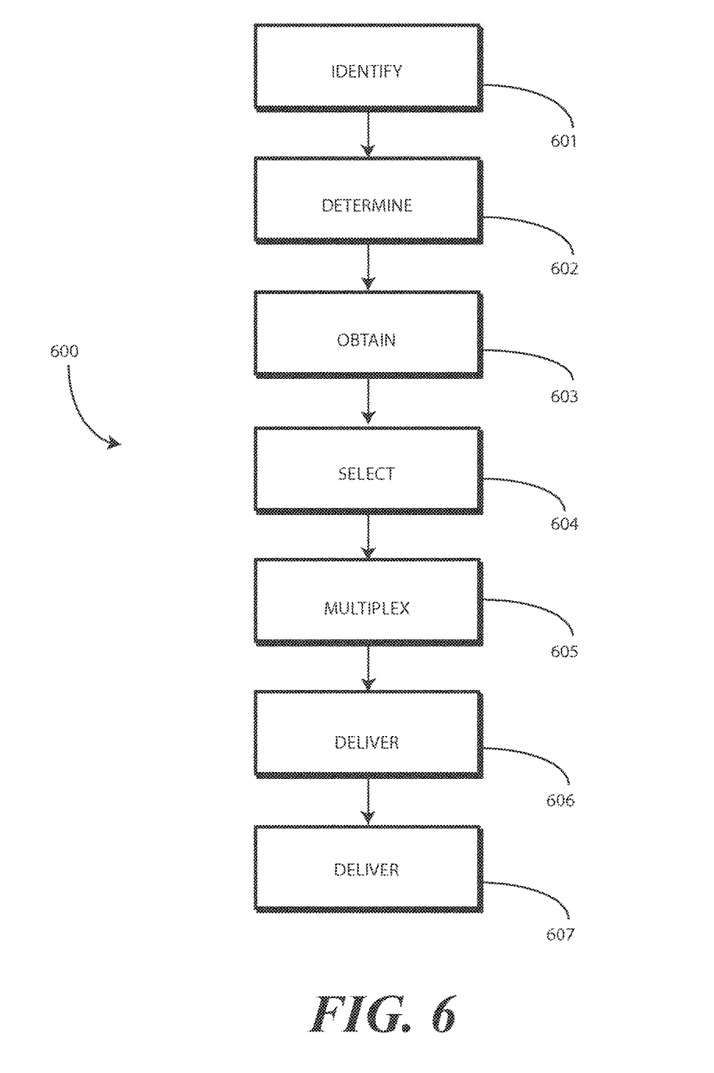
FIG. 6 illustrates an explanatory method in accordance with one or more embodiments of the disclosure.

Turning now to FIG. 6, illustrated therein is a method 600, suitable for use in a multimedia delivery system for delivering multimedia content containing one or more advertisements. At step 601, the method 600 identifies one or more triggers associated with a content offering. In one embodiment, each trigger indicates that one or more advertisement avails occur in the content offering subsequent to the one or more triggers.

In one embodiment, the triggers identified at step 601 comprise a content offering boundary. In another embodiment, the triggers identified at step 601 comprise a predefined rule set applied to the content offering. In one embodiment, the triggers comprise an SCTE-35 cue packet contained in the content offering received from a content provider.

At step 602, the method 600 determines a duration until at least one advertisement avail occurs at a subscriber device in the content offering. This duration can include system latencies such as the amount of time it takes the subscriber device to request the content, delivery times, and so forth. At step 603, the method 600 obtains at least one advertisement to insert in the at least one advertisement avail.

At step 604, the method 600 selects at least one advertisement. In one embodiment, this selection is based upon a function of a demographic factor common to each subscriber device. At step 605, the method 600 multiplexes portions of the selected advertisement with portions of the content offering occurring between the detected trigger(s) and the corresponding advertisement avail(s).

At step 606, the method 600 delivers the portions of the advertisement to a plurality of subscriber devices. In one embodiment, these portions are delivered as a multicast adaptive bit rate data stream. In one embodiment, the delivery occurring at step 606 occurs such that all portions of the advertisement are delivered during the determined duration and prior to the advertisement avail occurring or being completed at the subscriber device.

At step 607, the method 600 delivers at least cache notification message. In one embodiment, the cache notification message instructs that the portions of the advertisement are to be cached in edge devices until the advertisement avail occurs. In one embodiment, the cache notification message sent at step 607 further instructs insertion of the advertisement cached in the edge device into the content offering when the at least one advertisement avail occurs. Accordingly, the edge device can insert the trickled advertisement portions into the advertising avail when it occurs so that a subscriber sees the advertisement.

As shown and described, embodiments of the disclosure deliver small amounts of advertising, such as one to two minutes, that are cached in a subscriber device or edge server, and that require very little cache memory. A provider of a network can manage this advertising delivery to smooth network bandwidth demand by trickle feeding advertising so that it is delivered just in time for an advertising avail opportunity. The delivery of these advertisements can be used to fill in unused bandwidth between network capacity peaks, thereby increasing network efficiency.

In one embodiment, triggers are identified to commence the advertisement delivery. For example, where the trigger is a content boundary, delivery of the advertisement could begin just after subscriber "tunes" to the content offering or program. If the advertisement avail occurs immediately after the subscriber joins the program, and the selected advertisement has not arrived, a default advertisement in the content offering could be used. The trickled advertisement could be used for subsequent advertising avails if the business rules permit that usage.

In one or more embodiments, personalized advertising can be delivered to subscribers independent of programming content. The subscriber device, to keep memory requirements low, can cache only enough advertising for a single avail, overwriting old advertisements with new advertisements as they are received. While the subscriber is tuned to the content offering, precached targeted advertisements can be inserted at the next advertisement avail. The multicast server can then delivering targeted advertisements, with the subscriber device or edge device always keeping one to two minutes, approximately fifty megabytes or so, of advertisements cached for upcoming avails.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a multimedia delivery system for delivering multimedia content containing one or more advertisements, the method comprising:
    identifying, with a transcoder, one or more triggers of a content offering indicating that one or more advertisement avails occur in the content offering;
    obtaining, with an advertisement injector operable with the transcoder, at least one advertisement to insert in at least one advertisement avail;
    multiplexing, with the advertisement injector, portions of the at least one advertisement with portions of the content offering occurring between at least one trigger and the at least one advertisement avail;
    delivering, with a multicast server operable with the advertisement injector, the portions of the at least one advertisement to a plurality of subscriber devices as a data stream such that all portions of the at least one advertisement are delivered just prior to the at least one advertisement avail occurring or completing at one or more subscriber devices of the plurality of subscriber devices; and
    determining available bandwidth for transmission between a current time and when the advertisement avail occurs,
    wherein the data stream is transmitted with a bit rate adjusted to compensate for the determined available bandwidth.

2. The method of claim 1, further comprising delivering, with the multicast server, a message instructing the portions of the at least one advertisement to be cached in the plurality of subscriber devices until the at least one advertisement avail occurs.

3. The method of claim 2, the message further instructing insertion of the at least one advertisement cached in the plurality of subscriber devices into the content offering when the at least one advertisement avail occurs.

4. The method of claim 2, the message further comprising a cache policy identifying a minimum duration during which the portions of the at least one advertisement are to be cached in the plurality of subscriber devices.

5. The method of claim 1, the at least one trigger comprising a content offering boundary.

6. The method of claim 1, the at least one trigger comprising a subscriber device tuning to the adaptive bit rate multicast server.

7. The method of claim 1, further comprising selecting, with an advertisement selector, the at least one advertisement as a function of a demographic factor common to each subscriber device of the plurality of subscriber devices.

8. The method of claim 7, the demographic factor comprising a location of the plurality of subscriber devices.

9. A server structure, comprising:
 a transcoder to receive a content offering from a content provider, the transcoder further to identify one or more triggers associated with the content offering that indicate one or more advertising avails occur in the content offering;
 a placement opportunity manager to request one or more advertisements for insertion into the one or more advertising avails;
 an advertisement injector to:
  select the one or more advertisements;
  multiplex portions of the one or more advertisements with portions content offering portions occurring between a trigger and a corresponding advertising avail; and
  generate a cache notification message;
 a multicast server operable with the advertisement injector to deliver the portions of the one or more advertisements to one or more subscriber devices such that all portions of the one or more advertisements are delivered between the trigger and the corresponding advertising avail occurring or completing in the one or more subscriber devices,
 wherein the multicast server determines available bandwidth for transmission between the trigger and when the advertising avail occurs,
 wherein the advertising avail is delivered with a bit rate adjusted to compensate for the determined available bandwidth.

10. The server structure of claim 9, the cache notification message instructing the one or more subscriber devices to cache the portions of the one or more advertisements until the corresponding advertising avail occurs.

11. The server structure of claim 10, the cache notification message further instructing the one or more subscriber devices to insert the one or more advertisements into the content offering when the corresponding advertising avail occurs.

12. The server structure of claim 9, the placement opportunity manager further to determine a duration between the trigger and the corresponding advertising avail occurring or completing at the one or more subscriber devices.

13. The server structure of claim 9, further comprising a multicast controller operable with the multicast server, the advertisement injector to send a pre-delivery advertisement notification comprising resource locators to the one or more advertisements to the multicast controller.

14. The server structure of claim 13, the multicast controller to determine whether sufficient resource availability exists for the multicast server to deliver the portions of the one or more advertisements to the one or more subscriber devices such that all portions of the one or more advertisements are delivered between the trigger and the corresponding advertising avail occurring or completing at the one or more subscriber devices.

15. The server structure of claim 14, the multicast controller to cause the multicast server to deliver the cache notification message to the one or more subscriber devices.

16. The method of claim 1, wherein a just-in-time transmission of the at least one advertisement is made just before the advertisement avail occurs in the program to a cache by transmitting across a network at a normal rate or trickle feeding over time, depending upon the determined available network bandwidth.

17. The method of claim 1, wherein a just-in-time transmission of the at least one advertisement is made just before the advertisement avail occurs in the program to a cache by transmitting across a network using a unicast or a multicast, depending upon the determined available network bandwidth.

18. The method of claim 1, further comprising: determining based on current target viewers which targeted ads to cache based on the available network bandwidth and time to the ad avail across different ones of the target viewers.

19. The server structure of claim 9, wherein a just-in-time transmission of the at least one advertisement is made just before the advertisement avail occurs in the program to a cache by transmitting across a network at a normal rate or trickle feeding over time, depending upon the determined available network bandwidth.

20. The server structure of claim 9, wherein a just-in-time transmission of the at least one advertisement is made just before the advertisement avail occurs in the program to a cache by transmitting across a network using a unicast or a multicast, depending upon the determined available network bandwidth.

* * * * *